US011904921B2

United States Patent
Ifuku et al.

(10) Patent No.: US 11,904,921 B2
(45) Date of Patent: Feb. 20, 2024

(54) HANDCART

(71) Applicant: Makita Corporation, Anjo (JP)

(72) Inventors: Yasuo Ifuku, Anjo (JP); Susumu Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 868 days.

(21) Appl. No.: 16/986,821

(22) Filed: Aug. 6, 2020

(65) Prior Publication Data

US 2021/0039701 A1   Feb. 11, 2021

(30) Foreign Application Priority Data

Aug. 8, 2019 (JP) ................................. 2019-146887

(51) Int. Cl.
*B62B 3/08* (2006.01)
*B62B 5/06* (2006.01)
*B62B 3/00* (2006.01)

(52) U.S. Cl.
CPC ................ *B62B 3/08* (2013.01); *B62B 3/002* (2013.01); *B62B 5/06* (2013.01)

(58) Field of Classification Search
CPC .. B60P 1/16; B60P 1/283; B60P 1/286; B62B 3/08; B62B 3/002; B62B 5/06; B62B 2203/07
USPC ..................... 298/38, 1 C, 2, 5; 292/278, 336
See application file for complete search history.

(56) References Cited

U.S. PATENT DOCUMENTS

| | | | | |
|---|---|---|---|---|
| 5,395,163 A | * | 3/1995 | Mandell | ................... B60P 1/283 298/2 |
| 6,619,754 B1 | * | 9/2003 | Dombek | ................... B62B 3/08 298/1 C |
| 2006/0119164 A1 | * | 6/2006 | Heskin | ..................... B60P 1/283 298/1 C |

FOREIGN PATENT DOCUMENTS

| | | |
|---|---|---|
| CN | 106275029 A | 1/2017 |
| CN | 107097824 A | 8/2017 |
| CN | 207060112 U | 3/2018 |
| CN | 207758853 U | 8/2018 |
| JP | 54-178305 U | 6/1979 |

(Continued)

OTHER PUBLICATIONS

Communication dated Apr. 13, 2023 issued by the State Intellectual Propelty Office of the P.R.China in application No. 202010772223.5.

(Continued)

*Primary Examiner* — Stephen T Gordon
(74) *Attorney, Agent, or Firm* — Sughrue Mion, PLLC

(57) ABSTRACT

A handcart may include: a support frame; a container; a lock member configured to move between a locking position at which the lock member restricts rotation of the container relative to the support frame and an unlocked position at which the lock member allows the rotation of the container relative to the support frame; and a retainer member configured to move between a retaining position at which the retainer member restricts a movement of the lock member from the unlocked position to the locking position and a non-retaining position at which the retainer member allows the movement of the lock member from the unlocked position to the locking position. The lock member may be configured to move from the locking position to the unlocked position and be maintained in the unlocked posi- (Continued)

tion by a movement of the retainer member from the non-retaining position to the retaining position.

5 Claims, 17 Drawing Sheets

(56) References Cited

FOREIGN PATENT DOCUMENTS

| JP | H03-43098 Y2 | 9/1991 |
| JP | 2003-212125 A | 7/2003 |
| JP | 2014-145184 A | 8/2014 |

OTHER PUBLICATIONS

Japanese Office Action dated Feb. 21, 2023 in Japanese Application No. 2019-146887.

* cited by examiner

HANDCART

CROSS-REFERENCE TO RELATED APPLICATION

This application claims priority to Japanese Patent Application No. 2019-146887 filed on Aug. 8, 2019, the contents of which are hereby incorporated by reference into the present application.

TECHNICAL FIELD

The technique disclosed herein relates to a handcart.

DESCRIPTION OF RELATED ART

Japanese Examined Utility Model Application Publication No. H3-43098 describes a handcart including a support frame, a container configured to be rotated relative to the support frame, and a lock member disposed on the support frame and configured to move between a locking position at which the lock member restricts rotation of the container relative to the support frame and an unlocked position at which the lock member allows the rotation of the container relative to the support frame.

SUMMARY

In the handcart of Japanese Examined Utility Model Application Publication No. H3-43098, the lock member is configured to be at the locked position when the lock member is not held by a user. In this case, the user needs to rotate the container relative to the support frame while retaining the lock member at the unlocked position. Rotating the container relative to the support frame while retaining the lock member at the unlocked position may bother the user.

The disclosure herein provides a technique that improves convenience for a user of a handcart.

A handcart disclosed herein may comprise: a support frame; a container configured to be rotated relative to the support frame; a lock member disposed on one of the support frame and the container, the lock member configured to move between a locking position at which the lock member restricts rotation of the container relative to the support frame and an unlocked position at which the lock member allows the rotation of the container relative to the support frame; and a retainer member disposed on the other of the support frame and the container, the retainer member configured to move between a retaining position at which the retainer member restricts a movement of the lock member from the unlocked position to the locking position and a non-retaining position at which the retainer member allows the movement of the lock member from the unlocked position to the locking position. The lock member may be configured to move from the locking position to the unlocked position and be maintained in the unlocked position by a movement of the retainer member from the non-retaining position to the retaining position.

In the above configuration, the lock member is maintained at the unlocked position while the retainer member is at the retaining position. That is, even though the user does not retain the lock member, the support frame and the container are maintained unlocked. This enables the user to easily rotate the container relative to the support frame. Thus, the convenience for the user of the handcart can be improved.

DETAILED DESCRIPTION

In one or more embodiments, the handcart may further comprise a biasing member configured to bias the lock member to the locking position from the unlocked position and bias the retainer member to the retaining position from the non-retaining position.

The above configuration can surely maintain the lock member at the unlocked position while the retainer member is at the retaining position. Further, when the retainer member is at the non-retaining position, the lock member can return from the unlocked position to the locking position. Thus, when the retainer member is moved to the non-retaining position after a user has rotated the container, the lock member can automatically return from the unlocked position to the locking position.

In one or more embodiments, the lock member may be disposed on the support frame, and the retainer member may be disposed on the container.

Generally, the container is disposed on the support frame. The above configuration allows the retainer member to be disposed at a higher position as compared to a configuration where the retainer member is disposed on the support frame. Thus, the user can easily operate the retainer member.

In one or more embodiments, the retainer member may comprise an operation portion configured to be operable by a user. In a top view of the handcart, the operation portion may be disposed on an outer side than the support frame.

The above configuration enables the user to easily operate the retainer member.

In one or more embodiments, the retainer member may be a crank member.

The above configuration can improve the degree of freedom for the retainer member layout in the handcart. In addition, the configuration requires a reduced force for the user to operate the retainer member. Thus, the user can easily operate the retainer member.

Embodiment

Figure 1:
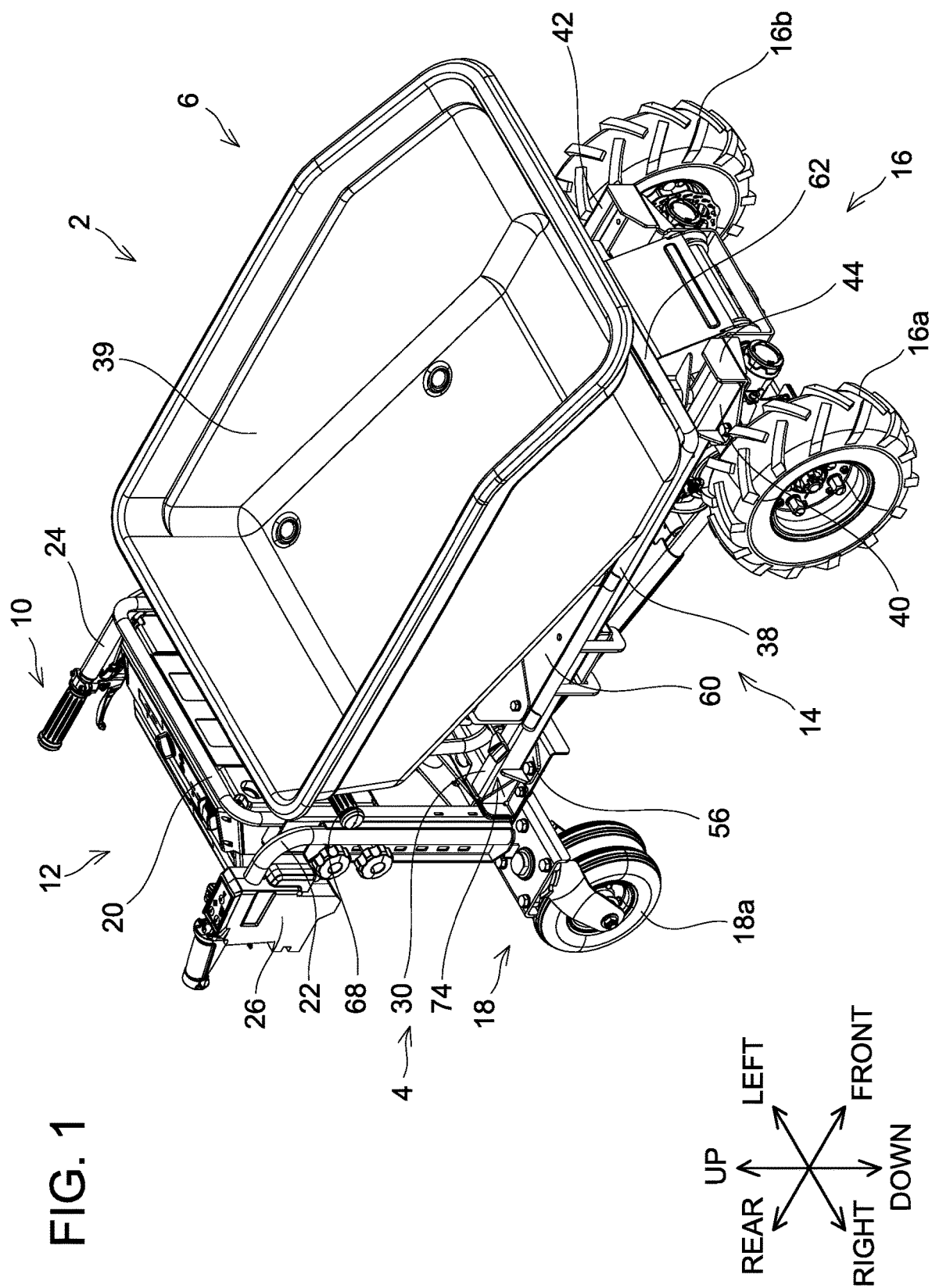
FIG. 1 is a perspective view of a cart 2 according to an embodiment when the cart 2 is viewed from upper-front-right side.
Figure 2:
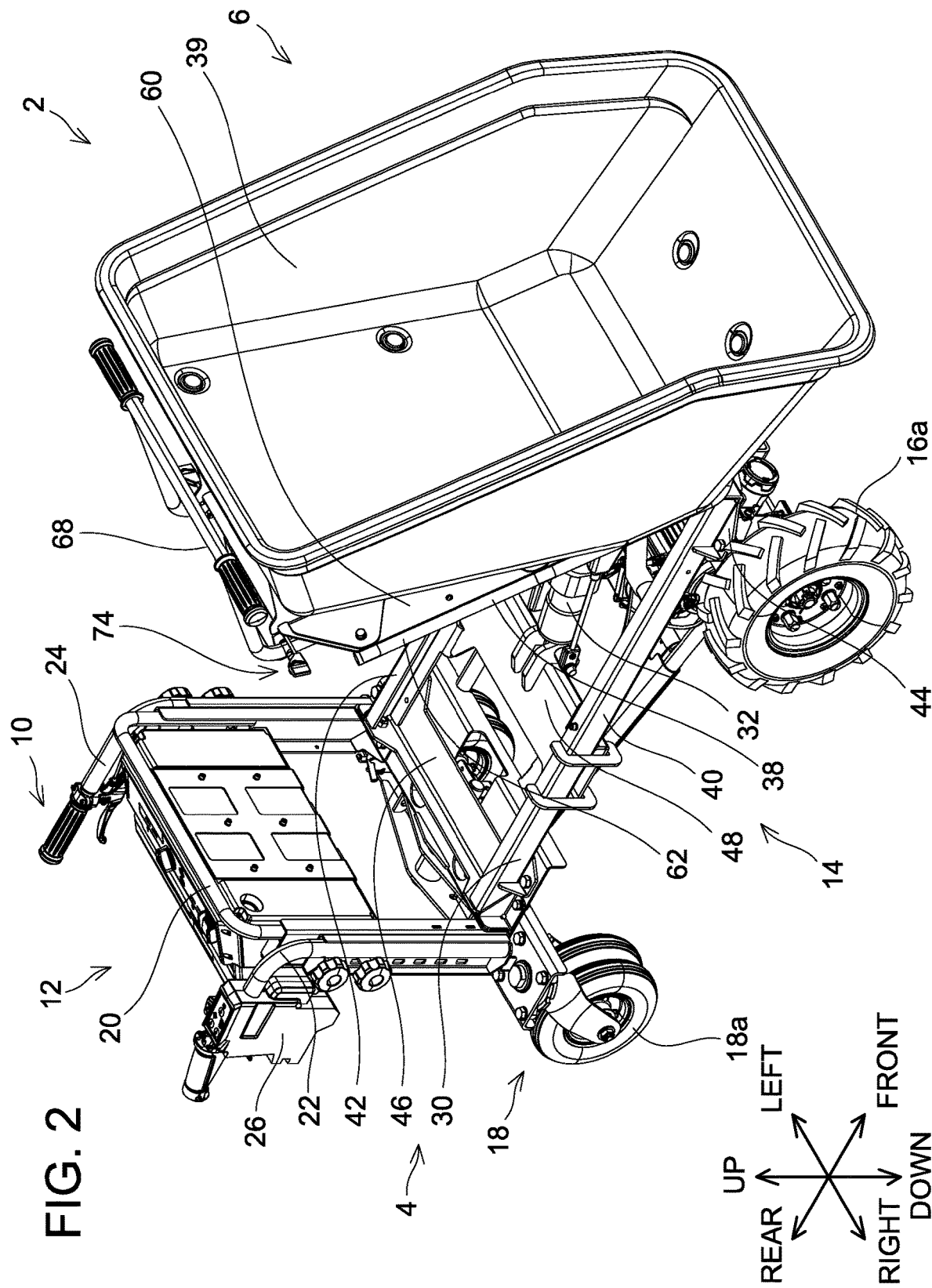
FIG. 2 is a perspective view of the cart 2 with a rotating frame 34 tilted relative to a fixed frame 30, when the cart 2 is viewed from upper-front-right side.
Figure 3:
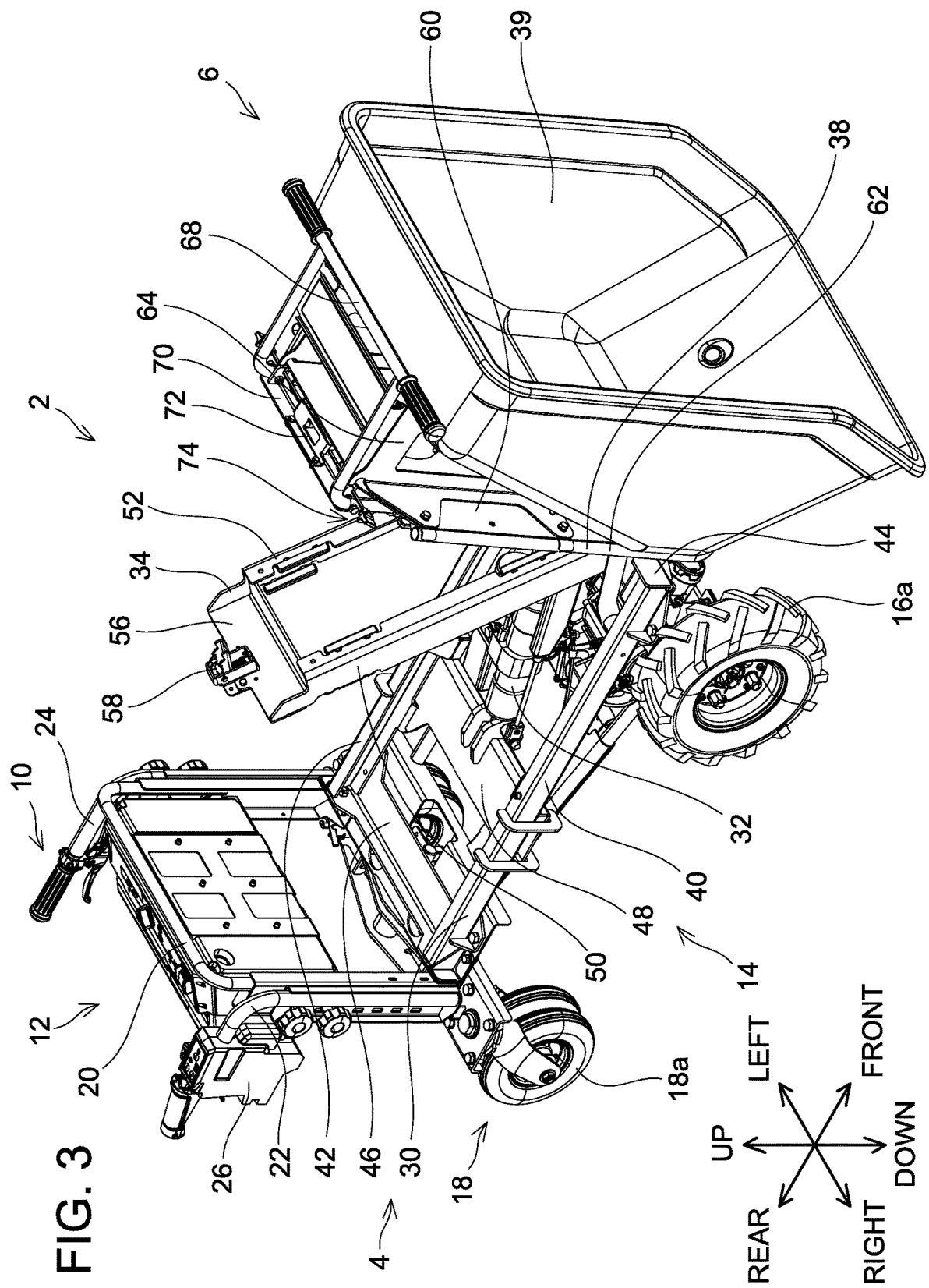
FIG. 3 is a perspective view of the cart 2 with the rotating frame 34 tilted relative to the fixed frame 30 and a container frame 38 tilted relative to the rotating frame 34, when the cart 2 is viewed from upper-front-right side.
Figure 4:
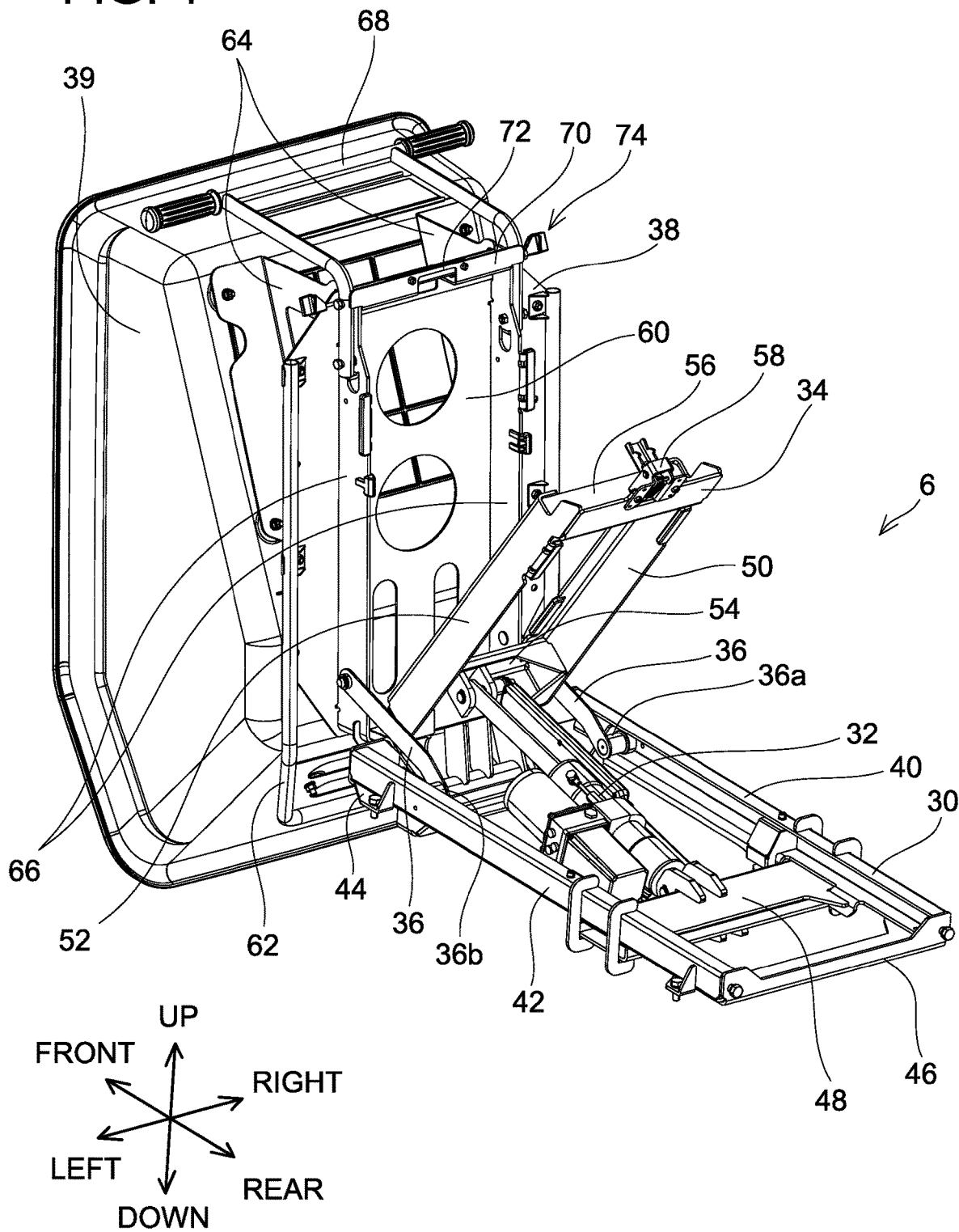
FIG. 4 is a perspective view of a container unit 6 according to the embodiment, when the container unit 6 is viewed from upper-rear-left side.
Figure 5:
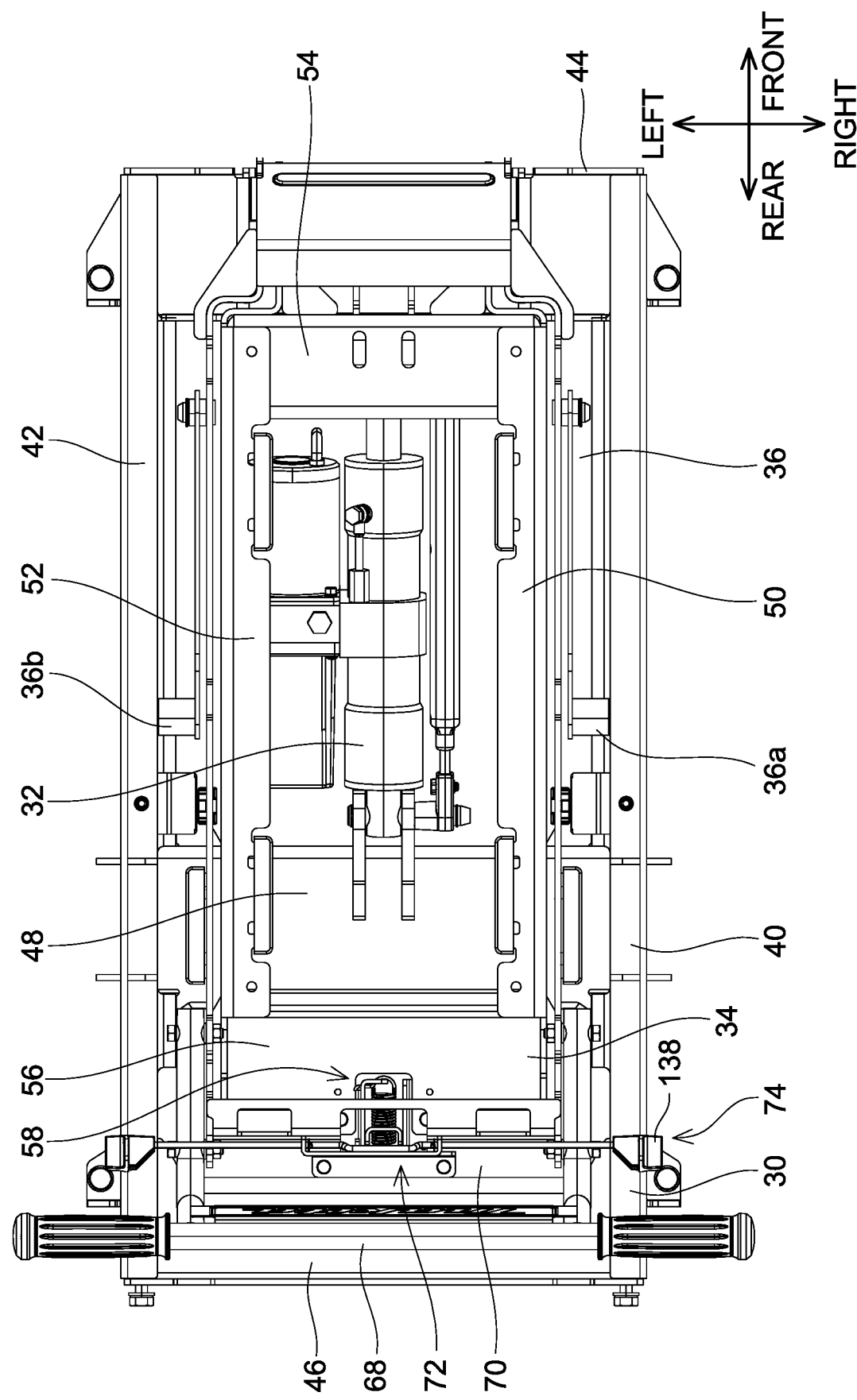
FIG. 5 is a partial top view of the container unit 6 according to the embodiment.
Figure 6A:
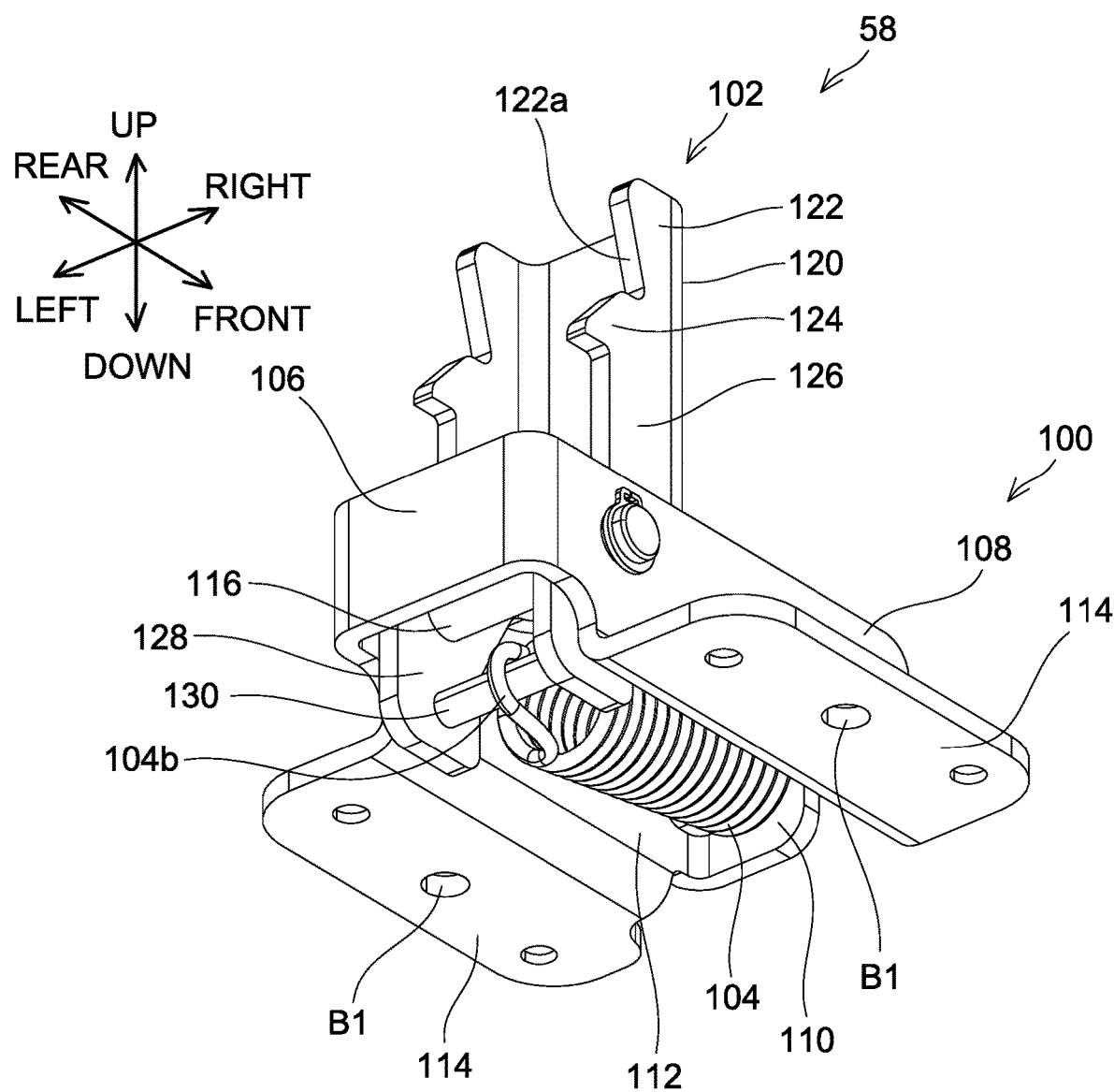
FIG. 6A is a perspective view of a lock mechanism 58 according to the embodiment, when lock mechanism 58 is viewed from lower-rear-right side.
Figure 6B:
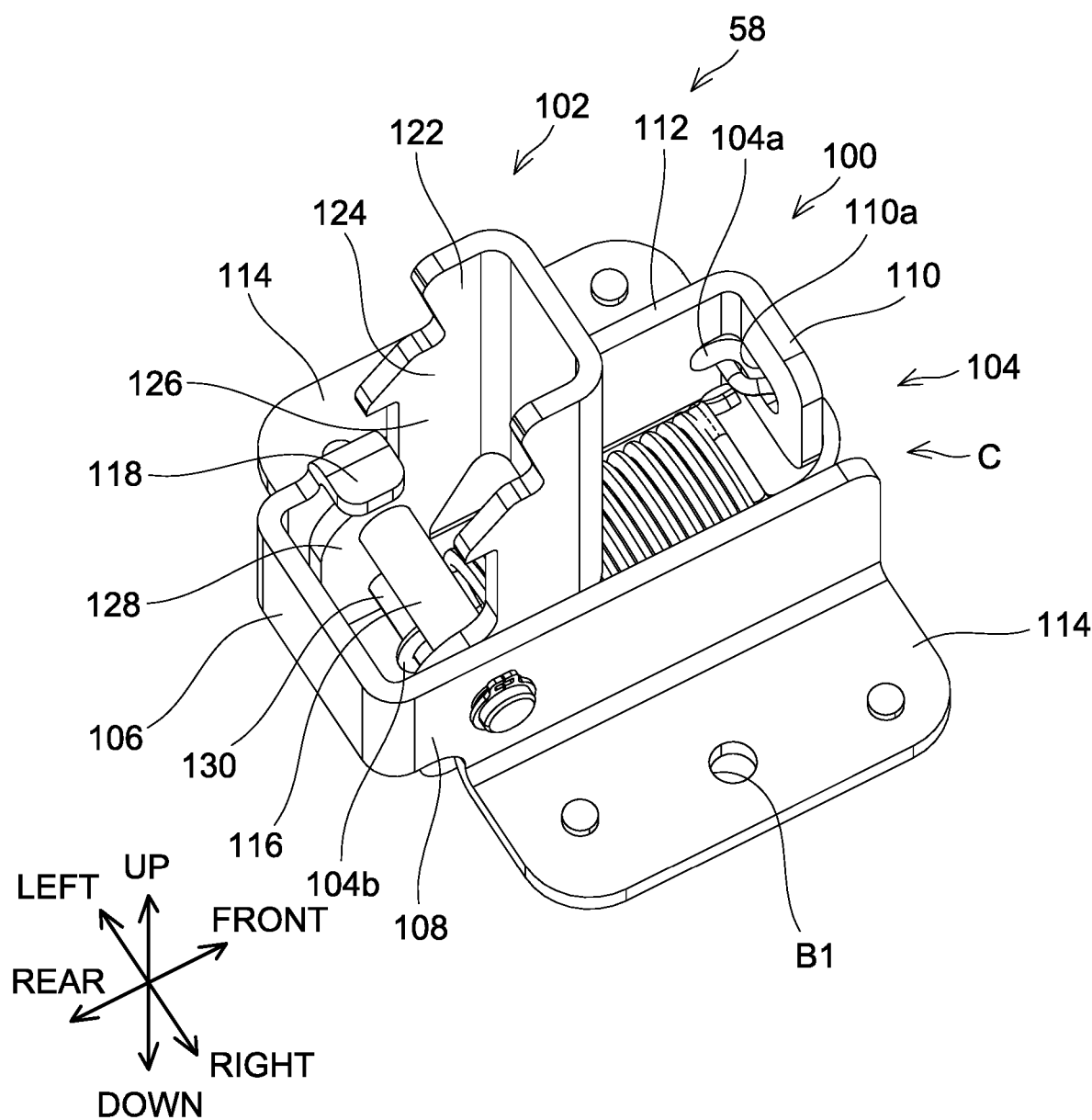
FIG. 6B is a perspective view of the lock mechanism 58 according to the embodiment, when lock mechanism 58 is viewed from upper-rear-right side.
Figure 7:
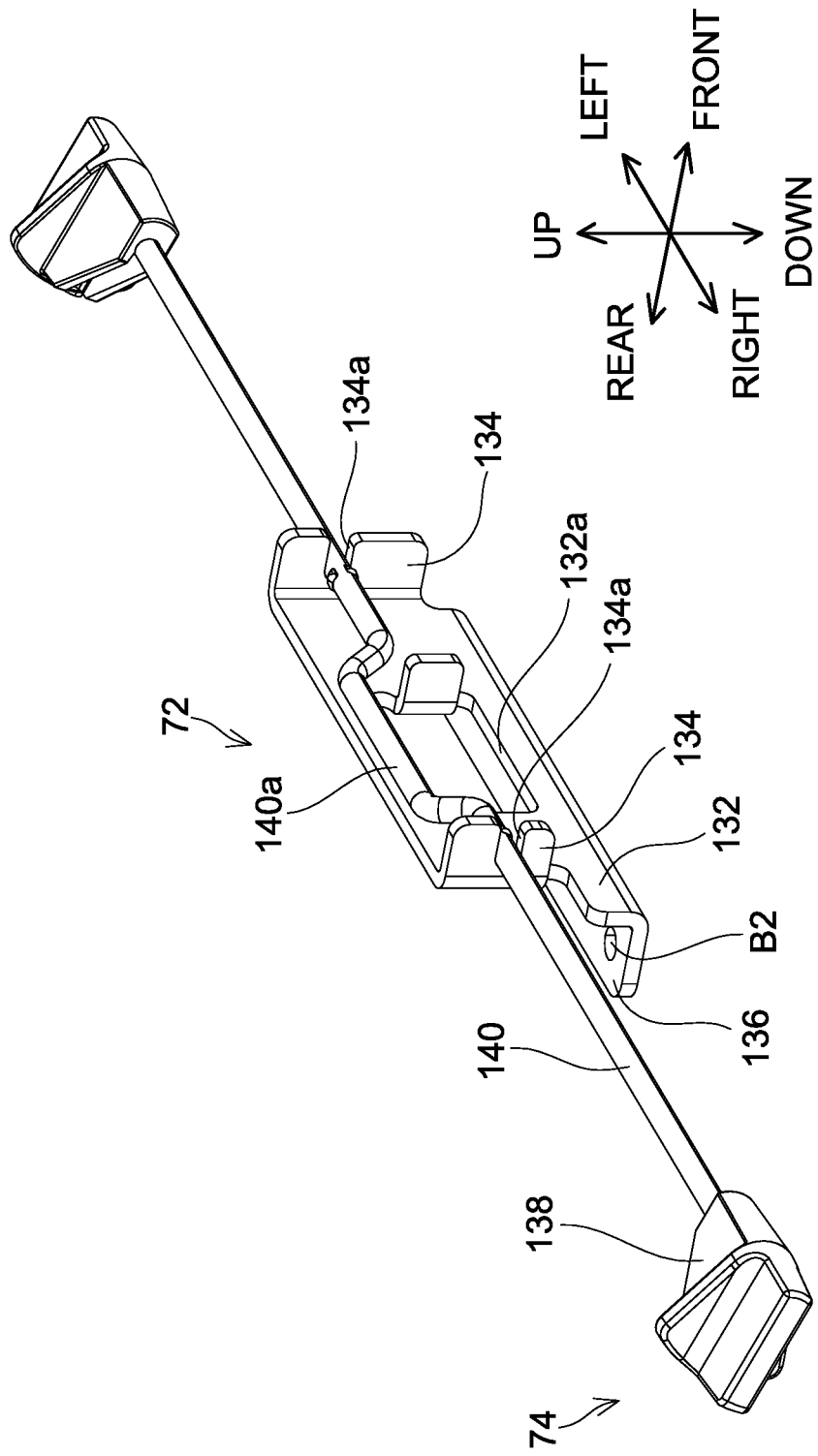
FIG. 7 is a perspective view of a lock receiving member 72 and a retainer member 74 when they are viewed from upper-front-right side.

Referring to FIGS. 1 to 8I, a cart 2 will be described. The cart 2 is a handcart. As shown in FIGS. 1 to 7, the cart 2 includes a chassis unit 4 and a container unit 6. FIGS. 1 to 3 are perspective views of the cart 2 when it is viewed from upper-front-right side, and FIG. 4 is a perspective view of the container unit 6 of the cart 2 when it is viewed from upper-rear-left side. FIG. 5 is a partial top view of the container unit 6. FIG. 6A is a perspective view of a lock mechanism 58 of the container unit 6 when it is viewed from lower-rear-right side, and FIG. 6B is a perspective view of the lock mechanism 58 when it is viewed from upper-rear-right side. FIG. 7 is a perspective view of a lock receiving member 72 and a retainer member 74 of the container unit 6 when they are viewed from upper-front-right side. FIGS. 8A to 8I are cross-sectional views showing how the lock mechanism 58, the lock receiving member 72, and the retainer member 74 moves.

(Configuration of Vehicle Unit 4)

As shown in FIG. 1, the chassis unit 4 includes a handle unit 10, a battery box 12, a chassis frame 14, front wheels 16, and rear wheels 18. The chassis frame 14 connects the front wheels 16 to the rear wheels 18. The front wheels 16 include a right front wheel 16a and a left front wheel 16b. By a motor (not shown) being driven, the front wheels 16 (i.e., the right front wheel 16a and the left front wheel 16b) rotate in a forward direction or in a reverse direction. The rear wheels 18 include a right rear wheel 18a and a left rear wheel (not shown). The battery box 12 houses a battery pack (not shown). Further, a container operation switch for operating an actuator 32 (which will be described later, see FIG. 3), a remaining charge display unit for displaying the remaining amount of the battery pack, and the like are disposed in/on the battery box 12. The motor is supplied with electric power from the battery pack. Operation of the motor is controlled by a control board (not shown).

As shown in FIG. 3, the handle unit 10 includes a handle base 20, a right handle 22, and a left handle 24. The handle base 20, the right handle 22, and the left handle 24 are screwed to the chassis frame 14. The battery box 12 is screwed to the handle base 20. A switch box 26 is disposed on the right handle 22. A switch for driving the motor, a switch for switching the rotation direction of the front wheels 16, and the like are disposed in the switch box 26.

(Configuration of Container Unit 6)

As shown in FIGS. 3 and 4, the container unit 6 includes a fixed frame 30, the actuator 32, a rotating frame 34, support arms 36 (see FIG. 4), container frame 38, and a bucket 39. The bucket 39 has a box shape with its upper side open.

As shown in FIG. 3, the fixed frame 30 includes a right channel 40, a left channel 42, a front plate 44, a rear plate 46, and a reinforcing frame 48. All of the right channel 40, the left channel 42, the front plate 44, the rear plate 46, and the reinforcing frame 48 are constituted of a steel material. The right channel 40 and the left channel 42 extend in a front-rear direction. The front plate 44 is welded to a front end of the right channel 40 and to a front end of the left channel 42. The rear plate 46 is welded to a rear end of the right channel 40 and to a rear end of the left channel 42. The front plate 44 and the rear plate 46 is screwed to the chassis frame 14. The reinforcing frame 48 extends in a right-left direction, a right end thereof is welded to the right channel 40, and a left end thereof is welded to the left channel 42. The actuator 32 is connected to a front surface of the reinforcing frame 48.

As shown in FIG. 4, the rotating frame 34 includes a right frame 50, a left frame 52, a front frame 54, a rear frame 56, and a lock mechanism 58. All of the right frame 50, the left frame 52, the front frame 54, and the rear frame 56 are constituted of a steel material. The right frame 50 and the left frame 52 extend in the front-rear direction. A front end of the right frame 50 and a front end of the left frame 52 are rotatably coupled to the front plate 44 of the fixed frame 30 and a front end of a lower frame 66 (which will be described later) of the container frame 38, such that the front end of the right frame 50 and the front end of the left frame 52 can rotate with the right-left direction as its rotational axis. The front frame 54 extends in the right-left direction between the vicinity of the front end of the right frame 50 and the vicinity of the front end of the left frame 52. The rear frame 56 extends in the right-left direction between a rear end of the right frame 50 and a rear end of the left frame 52. The lock mechanism 58 is screwed near a center of the rear frame 56. The lock mechanism 58 is located at a position corresponding to a lock receiving member 72 (which will be described later) of the container frame 38. The lock mechanism 58 will be described in detail later.

As shown in FIG. 4, the container frame 38 includes a base plate 60, a base pipe 62, an upper frame 64, the lower frame 66, a handle 68 configured to be gripped by a user, a rear plate 70, and the lock receiving member 72. All of the base plate 60, the base pipe 62, the upper frame 64, the lower frame 66, and the rear plate 70 are constituted of a steel material. The base plate 60 is disposed along the front-rear direction and the right-left direction. The base pipe 62 extends along a lower surface of a front lower portion of the bucket 39 and also extends along a lower surface of the base plate 60 in the front-rear direction. The base pipe 62 is screwed to the front lower portion of the bucket 39 and the base plate 60. The upper frame 64 is disposed along the front-rear direction and an up-down direction between a lower surface of a rear lower portion of the bucket 39 and an upper surface of the base plate 60. The upper frame 64 is screwed to the rear lower portion of the bucket 39 and the base plate 60. The lower frame 66 extends along the lower surface of the base plate 60 in the front-rear direction. The handle 68 is located rearward of the bucket 39 under a state where the container frame 38 is not rotated. The handle 68 is screwed to the lower frame 66. The rear plate 70 is welded to a rear end of the base plate 60 and extends rearward. The lock receiving member 72 is screwed to the rear plate 70. The lock mechanism 58 of the rotating frame 34, the lock receiving member 72 of the container frame 38, and a retainer member of the container frame 38 configure a mechanism for locking/unlocking the rotating frame 34 and the container frame 38. The lock receiving member 72 and the retainer member 74 will be described in detail later.

As shown in FIG. 4, upper ends of the support arms 36 are rotatably coupled to the vicinity of the front end of the lower frame 66 of the container frame 38 such that the upper ends of the support arms 36 can rotate with the right-left direction as its rotational axis. The support arms 36 are constituted of a steel material. Lower ends of the support arms 36 include rollers 36a and 36b, respectively. The rollers 36a and 36b are supported in the right channel 40 and the left channel 42 of the fixed frame 30, respectively.

The actuator 32 shown in FIG. 4 is a linear actuator configured to contract and expand, such as a hydraulic cylinder. The actuator 32 is connected to a hydraulic pump (not shown). One end of the actuator 32 is rotatably supported by the reinforcing frame 48 of the fixed frame 30 such that the one end of the actuator 32 can rotate with the right-left direction as its rotational axis. Another end of the actuator 32 is rotatably supported by the front frame 54 of the rotating frame 34 such that the other end of the actuator 32 can rotate with the right-left direction as its rotational axis. The actuator 32 is connected to the battery box 12 of the chassis unit 4 via a power cable (not shown). The actuator 32 is supplied with electric power from the battery pack (not shown) in the battery box 12. The operation of the actuator 32 is controlled by the control board (not shown).

(Configurations of Lock Mechanism 58, Lock Receiving Member 72, and Retainer Member 74) Referring to FIGS. 4, 5, 6A, 6B, 7, and 8A, the lock mechanism 58 of the rotating frame 34, the lock receiving member 72 of the container frame 38, and the retainer member 74 of the container frame 38 will be described.

(Configuration of Lock Mechanism 58; FIGS. 4, 6A, 6B, and 8A)

Referring to FIGS. 4, 6A, 6B, and 8A, the lock mechanism 58 of the rotating frame 34 will be described. As shown in FIGS. 6A and 6B, the lock mechanism 58 includes a base 100, a lock member 102, and a spring 104. As shown in FIG. 6B, the base 100 includes a rear wall 106, a right wall 108, a front wall 110, and a left wall 112. The front wall 110 and the left wall 112 each include a notch 110a. A clearance C is disposed between the front wall 110 and the right wall 108. A flange 114 extending outward is disposed at each of bottom portions of the right wall 108 and the left wall 112. As shown in FIG. 6A, a threaded hole B1 is disposed in each flange 114. The threaded holes B1 are for screwing the base 100 to the rear frame 56 of the rotating frame 34. As shown in FIG. 6B, a shaft 116 is attached to the right wall 108 and the left wall 112. The shaft 116 penetrates the right wall 108 and the left wall 112. A stopper 118 extending rightward from an upper end of the left wall 112 is disposed above the shaft 116. The stopper 118 is a mechanism for restricting movement of the lock member 102.

Figure 8A:
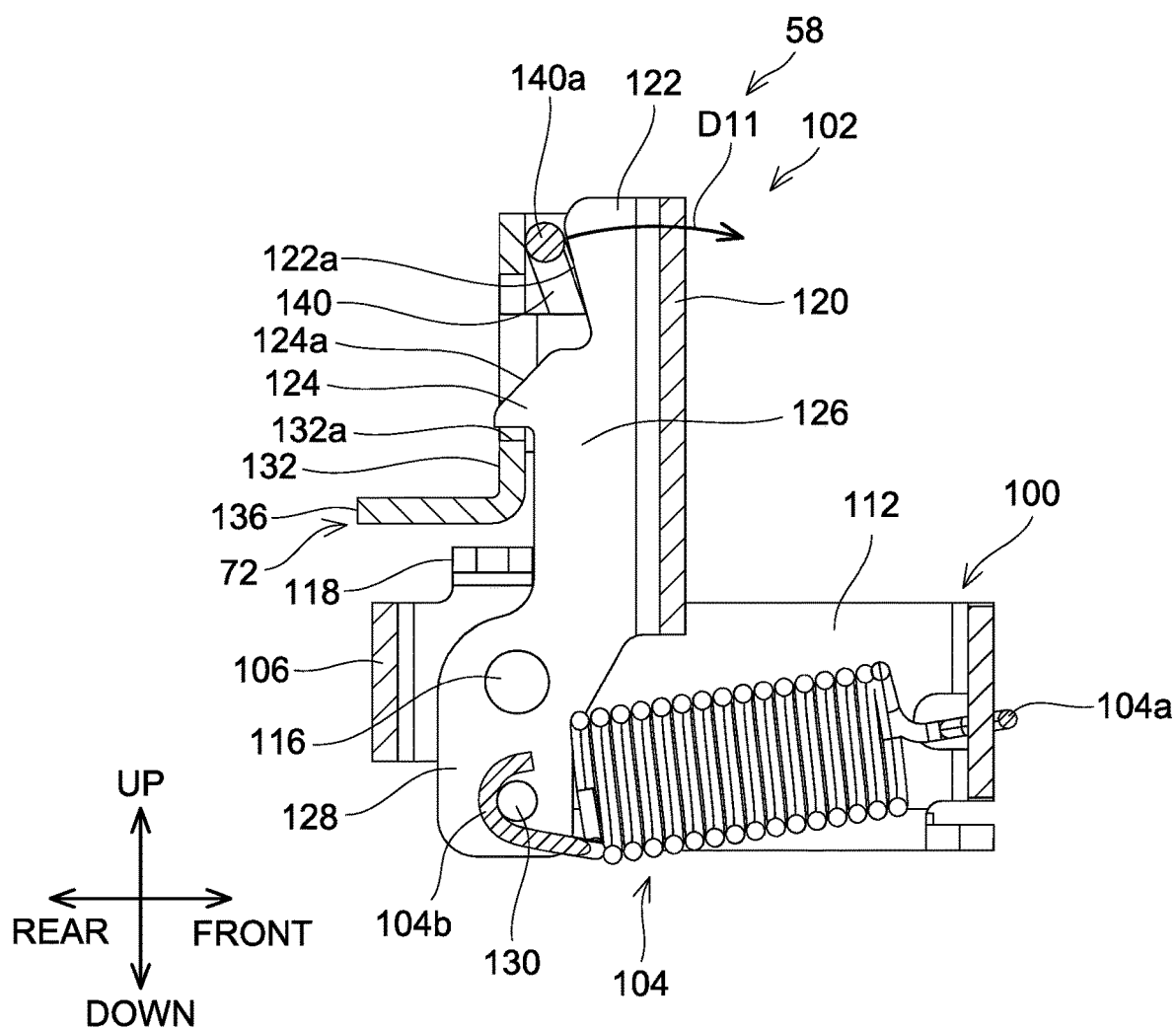
FIG. 8A is a cross-sectional view (1) showing how the lock mechanism 58, the lock receiving member 72, and the retainer member 74 according to the embodiment moves.

As shown in FIGS. 6A, 6B, and 8A, the lock member 102 includes a front wall 120, a guide 122, a hook 124, a flat portion 126, and a connection portion 128. The guide 122, the hook 124, and the flat portion 126 extend rearward from left and right ends of the front wall 120. The guide 122 includes an inclined portion 122a that is inclined forward from its upper side to lower side. The hook 124 is disposed below the guide 122. The hook 124 has a hook shape. An upper portion of the hook 124 has an inclined portion 124a that is inclined downward from its front to rear. The flat portion 126 is disposed below the hook 124. The connection portion 128 is disposed below the flat portion 126. The shaft 116 penetrates left and right ends of the connection portion 128. Thus, the shaft 116 couples the base 100 with the lock member 102 by penetrating through the right wall 108 of the base 100, the left wall 112 of the base 100, and the connection portion 128. Further, in the connection portion 128, a pin 130 is attached below the shaft 116.

As shown in FIGS. 6B and 8A, a front end 104a of the spring 104 is hooked to the notch 110a of the front wall 110 of the base 100. As shown in FIGS. 6A and 8A, a rear end 104b of the spring 104 is hooked to the pin 130 attached to the lower portion of the lock member 102.

(Configurations of Lock Receiving Member 72 and Retainer Member 74; FIGS. 4, 5, 7, and 8A)

Referring to FIGS. 4, 5, 7, and 8A, the lock receiving member 72 and the retainer member 74 of the container frame 38 will be described. As shown in FIG. 7, the lock receiving member 72 includes a base 132, shaft coupling portions 134, and a flange 136. The base 132 has an opening 132a. As shown in FIG. 8A, the hook 124 of the lock member 102 is inserted into the opening 132a. As shown in FIG. 7, the shaft coupling portions 134 extend forward from left and right ends of the base 132. The shaft coupling portions 134 include notches 134a. The flange 136 extends rearward from a lower end of the base 132. The flange 136 has a threaded hole B2. The threaded hole B2 is for screwing the lock receiving member 72 to the rear plate 70 of the container frame 38. As shown in FIG. 5, in a top view of the cart 2, the lock mechanism 58 and the lock receiving member 72 overlap to each other.

The retainer member 74 includes an operation portion 138 and a crankshaft 140. As shown in FIG. 5, the operation portion 138 is disposed on an outer side than the rotating frame 34. As shown in FIG. 7, the operation portion 138 has a knob shape. The operation portion 138 is coupled to the crankshaft 140. The crankshaft 140 passes through the notches 134a of the lock receiving member 72. The crankshaft 140 includes a crank portion 140a. The crank portion 140a is located between the left and right shaft coupling portions 134 of the lock receiving member 72. The crankshaft 140 can be operated by the user operating the operation portion 138.

(Movements of Lock Mechanism 58, Lock Receiving Member 72, and Retainer Member 74; FIGS. 8A to 8I)

Next, referring to FIGS. 8A to 8I, movements of the lock mechanism 58, the lock receiving member 72, and the retainer member 74 will be described. FIGS. 8A to 8E show how the container frame 38 is rotated relative to the rotating frame 34 with the container frame 38 unlocked from the rotating frame 34. FIGS. 8F to 8I show how the container frame 38 is relocked with the rotating frame 34. In FIGS. 8A and 8F to 8H, solid arrows D11 and D12 indicate rotation directions of the lock member 102 of the lock mechanism 58, and broken arrows D21, D22, and D23 indicate rotation directions of the crank portion 140a of the crankshaft 140 of the retainer member 74. Further, a thick solid arrow F in FIG. 8B indicates a direction of force acting on the crank portion 140a.

In FIG. 8A, the hook 124 of the lock member 102 of the lock mechanism 58 is in the opening 132a of the base 132 of the lock receiving member 72. The crank portion 140a of the crankshaft 140 of the retainer member 74 is located between the guide 122 of the lock member 102 of the lock mechanism 58 and the base 132 of the lock receiving member 72. Lifting the container frame 38 upward relative to the rotating frame 34 in this state brings the base 132 of the lock receiving member 72 into contact with a lower end of the hook 124 of the lock member 102, as a result of which the container frame 38 cannot be lifted upward. That is, in FIG. 8A, rotation of the container frame 38 relative to the rotating frame 34 is restricted. Hereinafter, the position of the lock member 102 of the lock mechanism 58 in FIG. 8A may be referred to as a "locking position". Further, the position of the crank portion 140a of the crankshaft 140 of the retainer member 74 in FIG. 8A may be referred to as a "non-retaining position".

Figure 8B:
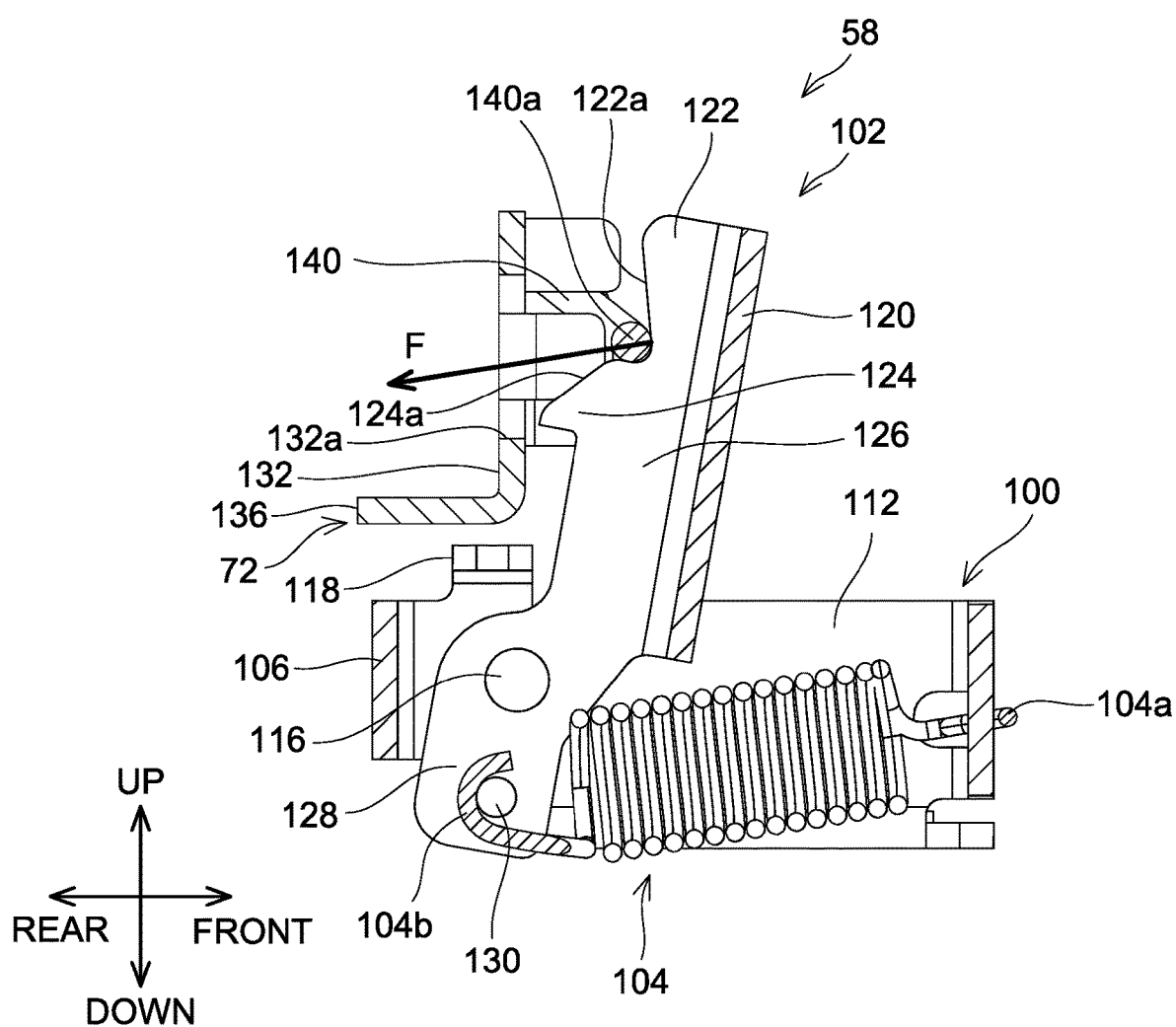
FIG. 8B is a cross-sectional view (2) showing how the lock mechanism 58, the lock receiving member 72, and the retainer member 74 according to the embodiment moves.

To unlock the container frame 38 from the rotating frame 34, the user operates the operation portion 138 of the retainer member 74. Specifically, the user operates the operation portion 138 such that the crank portion 140a of the crankshaft 140 of the retainer member 74 rotates forward and downward. As the crank portion 140a rotates forward and downward, the lock member 102 also rotates forward and downward about the shaft 116 (see arrow D11 in FIG. 8A). The guide 122 (i.e., the upper portion) of the lock member 102 is rotated forward and downward, and the connection portion 128 (i.e., the lower portion) of the lock member 102 is rotated rearward and upward. As shown in FIG. 8B, the crank portion 140a moves along the inclined portion 122a of the guide 122 until it reaches the connection between the guide 122 and the hook 124 of the lock member 102. This moves the hook 124 of the lock member 102 to a position forward than the base 132 of the lock receiving member 72. That is, the hook 124 is brought out of the opening 132a of the base 132 and the container frame 38 is unlocked from the rotating frame 34. Thus, the user can lift the container frame 38 upward relative to the rotating frame 34. Hereinafter, the position of the lock member 102 of the lock mechanism 58 in FIG. 8B may be referred to as an "unlocked position". Further, the position of the crank portion 140a of the crankshaft 140 of the retainer member 74 in FIG. 8B may be referred to as a "retaining position".

As described above, as the crank portion 140a of the crankshaft 140 rotates forward and downward, the connection portion 128 of the lock member 102 rotates rearward and upward. This expands the spring 104. Thus, a biasing force by the spring 104 acts on the connection portion 128. In this state, the biasing force acts rearward and downward on the guide 122 and the hook 124 of the lock member 102. Then, via the lock member 102, the biasing force acts rearward and downward (see arrow F in FIG. 8B) on the crank portion 140a at the connection of the guide 122 and the hook 124. This restricts the crank portion 140a from moving from the retaining position to the non-retaining position. Thus, moving the retainer member 74 from the non-retaining position to the retaining position moves the lock member 102 from the locking position to the unlocked position and maintains the lock member 102 at the unlocked position. This configuration eliminates a need to dispose a biasing member for biasing the retainer member 74 and a biasing member for biasing the lock member 102 separately. Thus, the number of components of the cart 2 can be reduced.

Figure 8C:
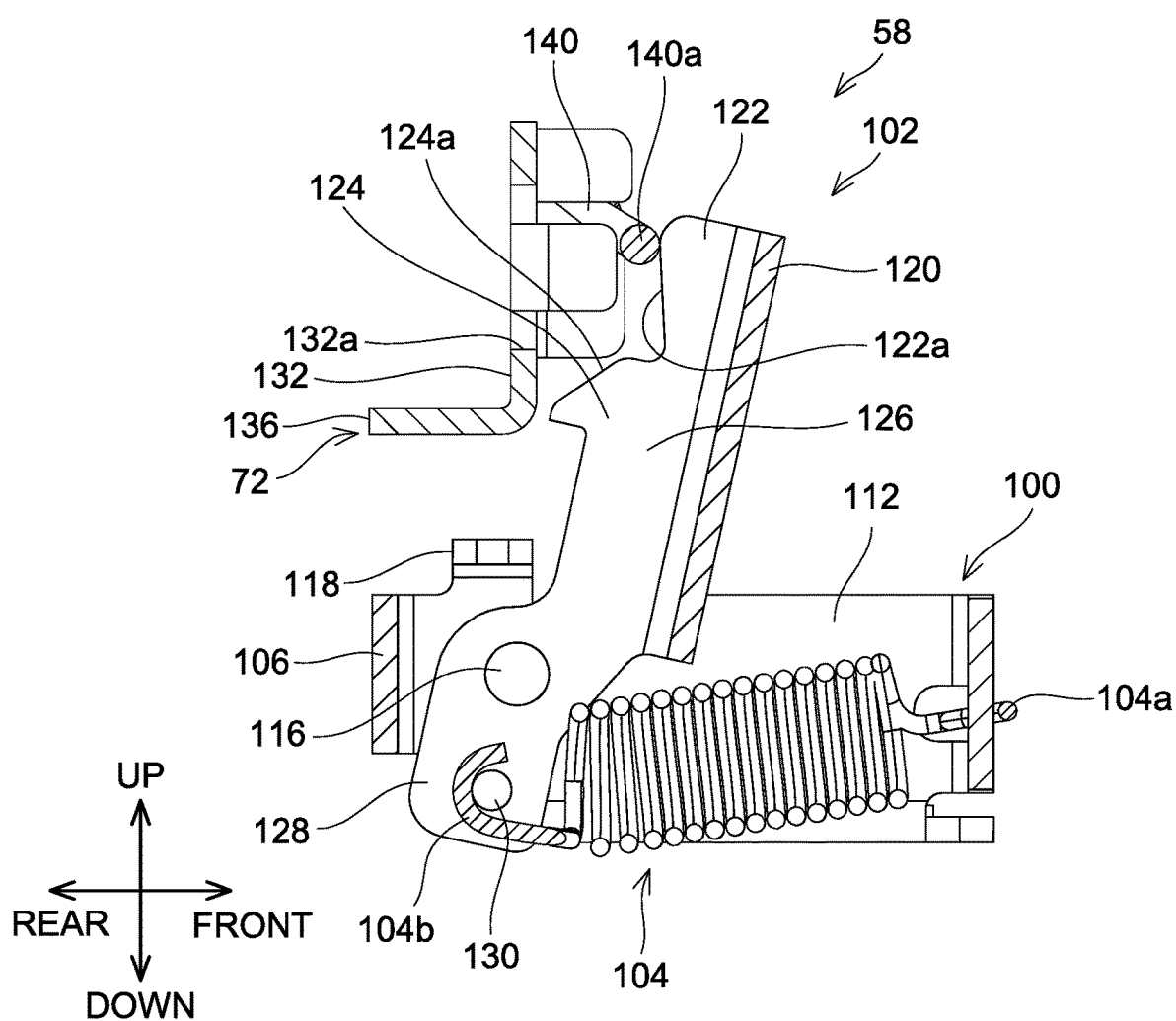
FIG. 8C is a cross-sectional view (3) showing how the lock mechanism 58, the lock receiving member 72, and the retainer member 74 according to the embodiment moves.
Figure 8D:
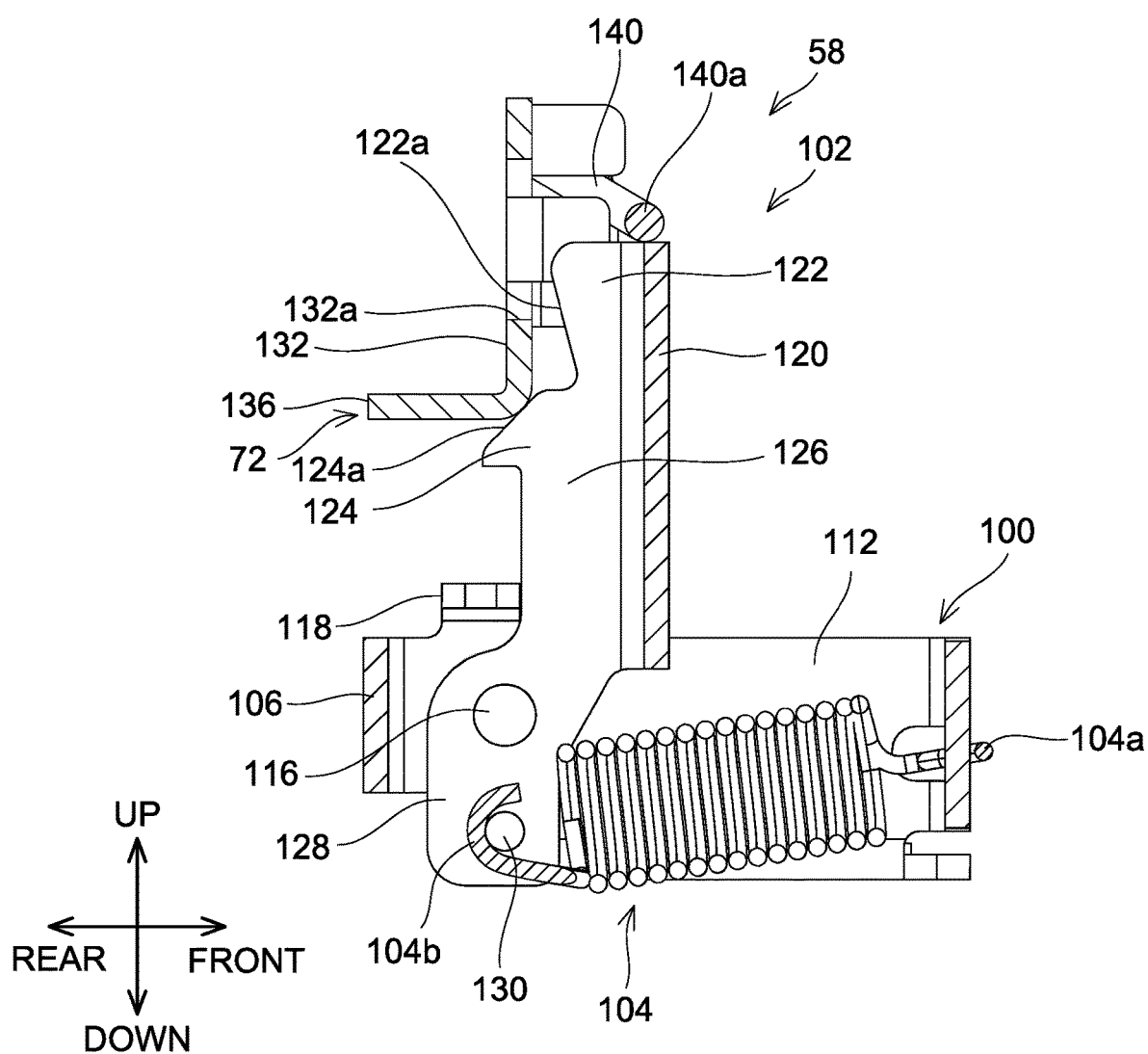
FIG. 8D is a cross-sectional view (4) showing how the lock mechanism 58, the lock receiving member 72, and the retainer member 74 according to the embodiment moves.
Figure 8E:
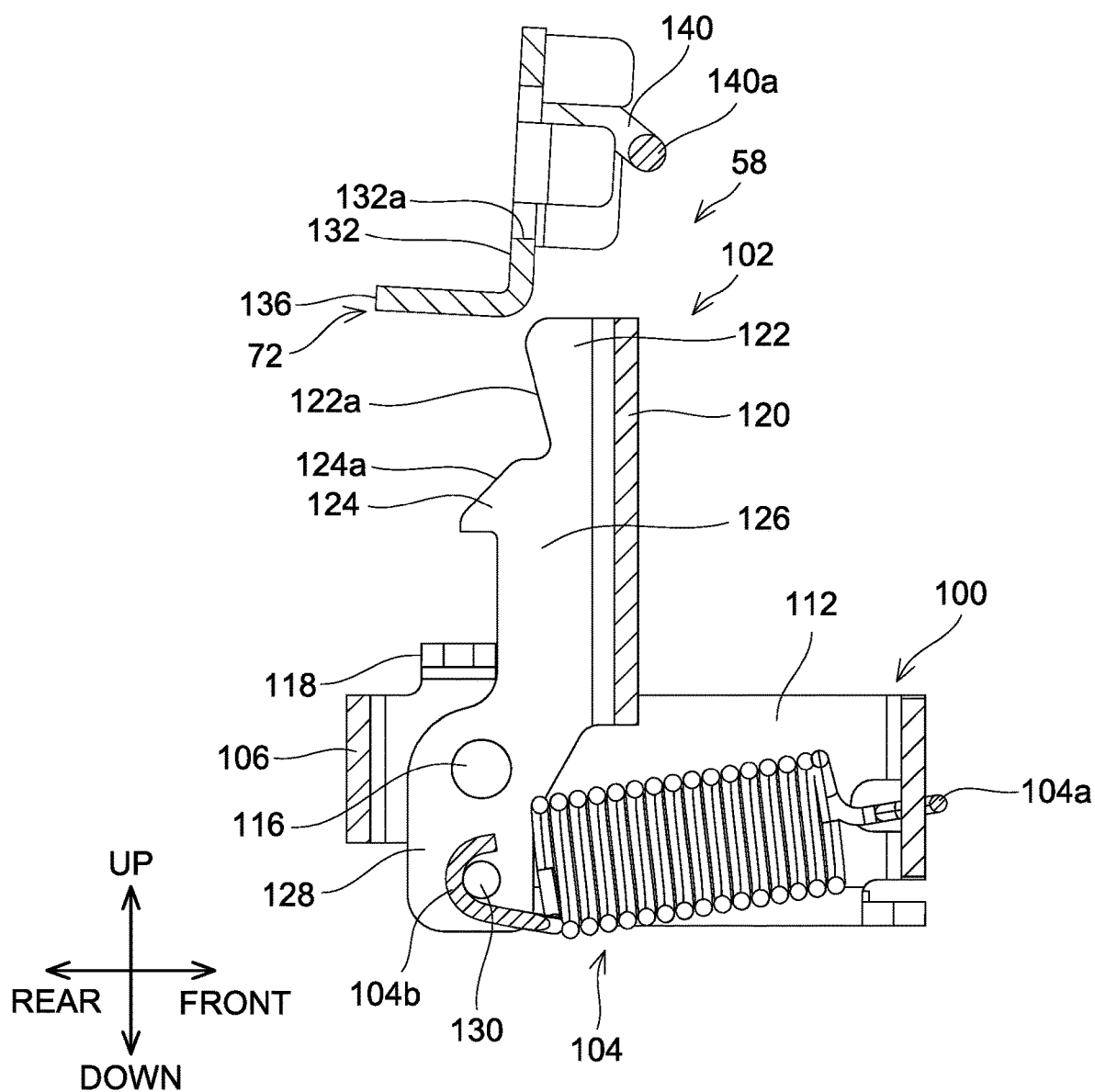
FIG. 8E is a cross-sectional view (5) showing how the lock mechanism 58, the lock receiving member 72, and the retainer member 74 according to the embodiment moves.

Next, the user grips the handle 68 of the container frame 38 and then lifts the container frame 38 upward. As shown in FIG. 8C, the hook 124 of the lock member 102 of the lock mechanism 58 is positioned forward of the base 132 of the lock receiving member 72, thus the base 132 does not contact the lock member 102 when the base 132 is moved upward. Therefore, the user can lift the container frame 38 upward. The lock member 102 is maintained at the unlocked position until the crank portion 140a of the crankshaft 140 of the retainer member 74 is moved to above the lock member 102. Then, when the crank portion 140a has been moved to above the lock member 102 as shown in FIG. 8D, the lock member 102 is returned from the locking position to the unlocked position by the biasing force of the spring 104. A rear end of the guide 122 of the lock member 102 is positioned forward of the base 132 of the lock receiving member 72. Thus, even when the user lifts the container frame 38 further upward, the base 132 of the lock receiving member 72 does not contact the guide 122 of the lock member 102. When the user lifts the container frame 38 further upward as shown in FIG. 8E, the lock receiving member 72 and the retainer member 74 are moved to above the lock mechanism 58. As a result, the user can unload soil, fertilizer, and the like in the bucket 39.

Figure 8F:
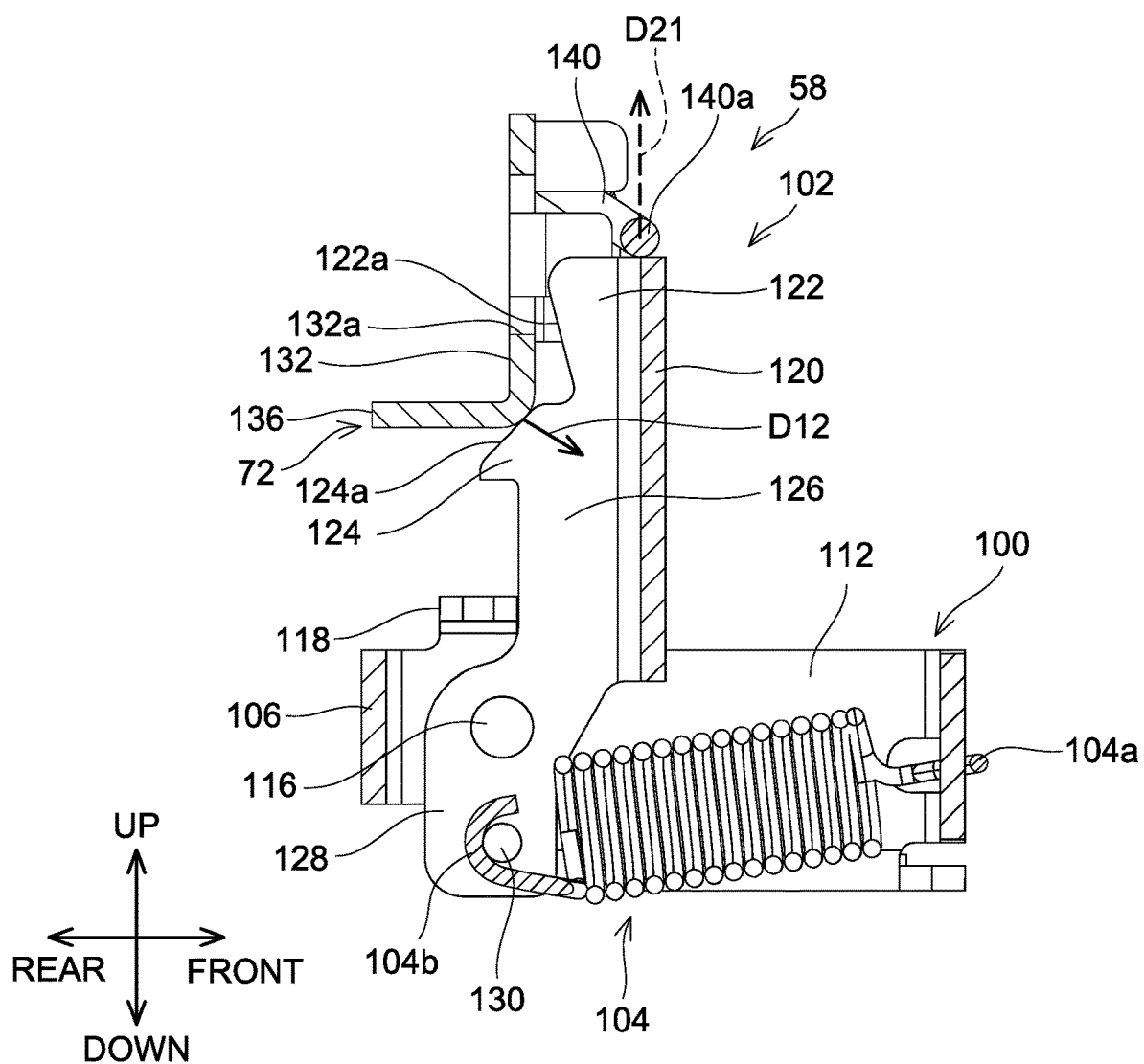
FIG. 8F is a cross-sectional view (6) showing how the lock mechanism 58, the lock receiving member 72, and the retainer member 74 according to the embodiment moves.

Once unloading the soil, fertilizers, and the like in the bucket 39, the user lowers the container frame 38 in order to return the container frame 38 to the position shown in FIG. 8A. As the user lowers the container frame 38, the lower end of the base 132 of the lock receiving member 72 first contacts the inclined portion 124a of the hook 124 of the lock member 102 as shown in FIG. 8F. At this point, the crank portion 140a of the crankshaft 140 of the retainer member 74 is in contact with the upper end of the guide 122 of the lock member 102. Then, as the user lowers the container frame 38 further as shown in FIG. 8G, the base 132 of the lock receiving member 72 is moved downward and the lock member 102 is thereby rotated.

Figure 8G:
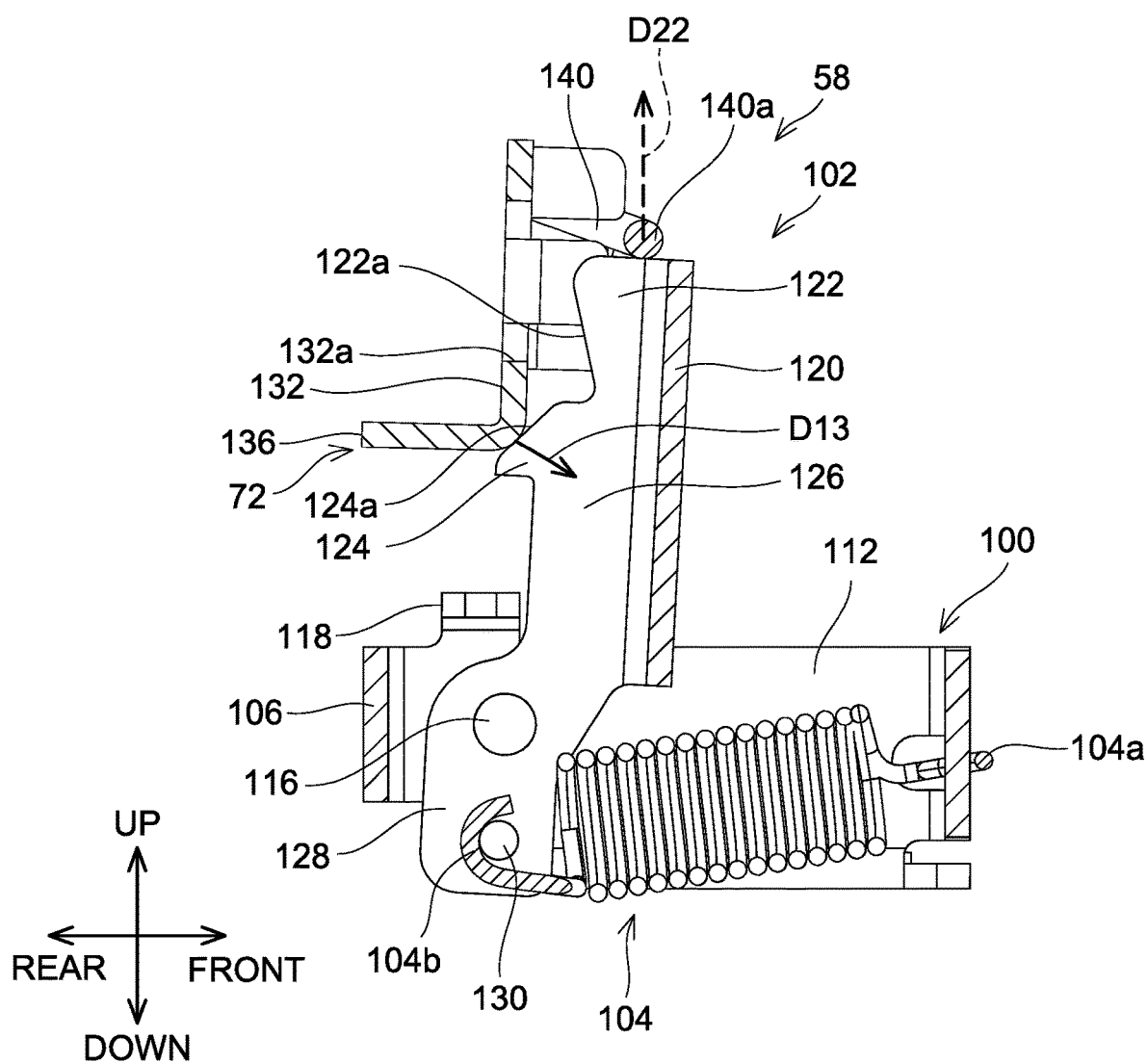
FIG. 8G is a cross-sectional view (7) showing how the lock mechanism 58, the lock receiving member 72, and the retainer member 74 according to the embodiment moves.

Specifically, the lock member 102 is rotated forward and downward (see the direction of arrow D12 in FIG. 8F, arrow D13 in FIG. 8G). Further, when the crankshaft 140 is moved downward with the crank portion 140a being in contact with the upper end of the lock member 102, the crank portion 140a is thereby rotated. Specifically, the crank portion 140a is rotated upward (see the direction of arrow D21 in FIG. 8F, arrow D22 in FIG. 8G). That is, the crank portion 140a is moved from the retaining position.

Figure 8H:
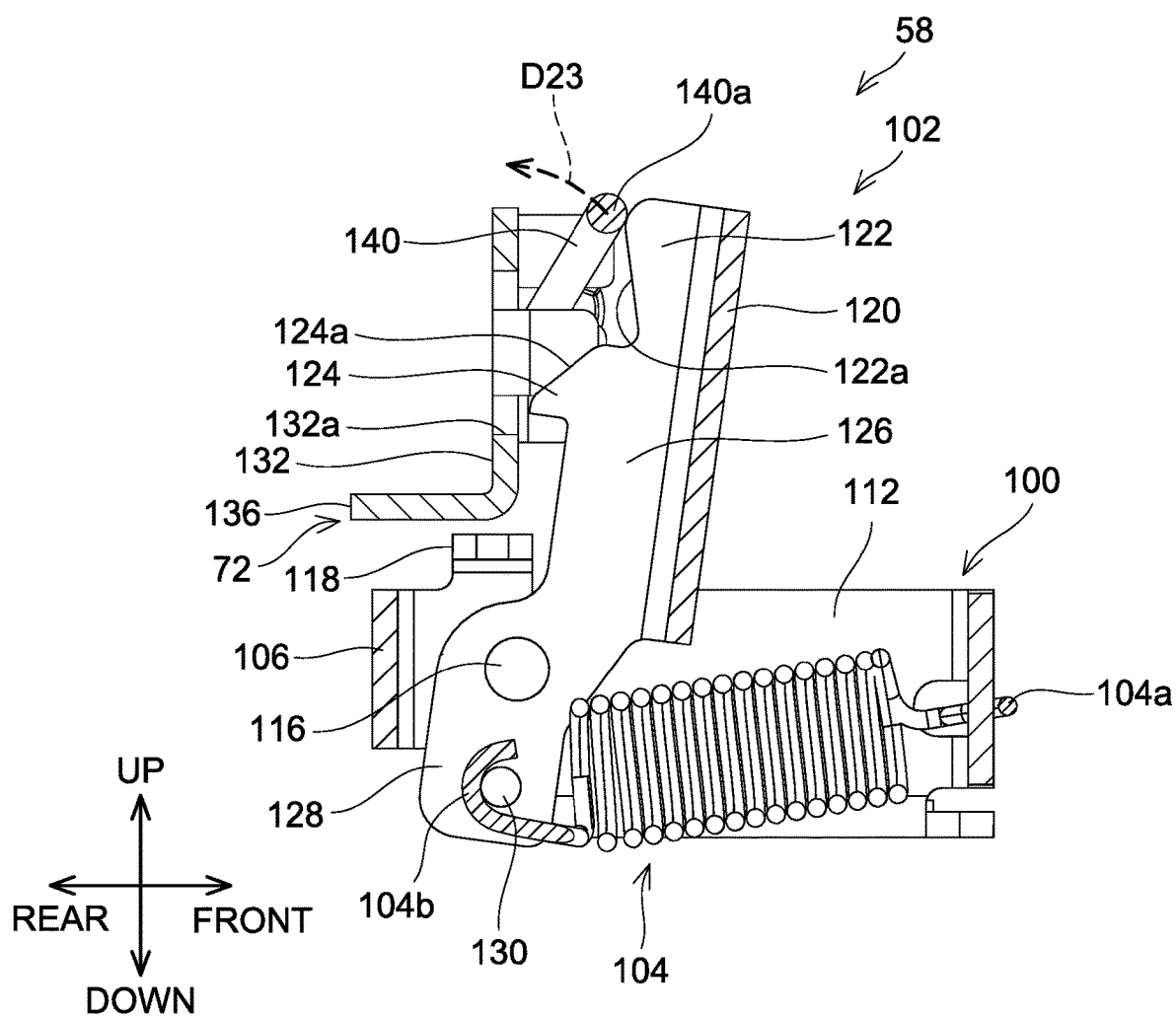
FIG. 8H is a cross-sectional view (8) showing how the lock mechanism 58, the lock receiving member 72, and the retainer member 74 according to the embodiment moves.
Figure 8I:
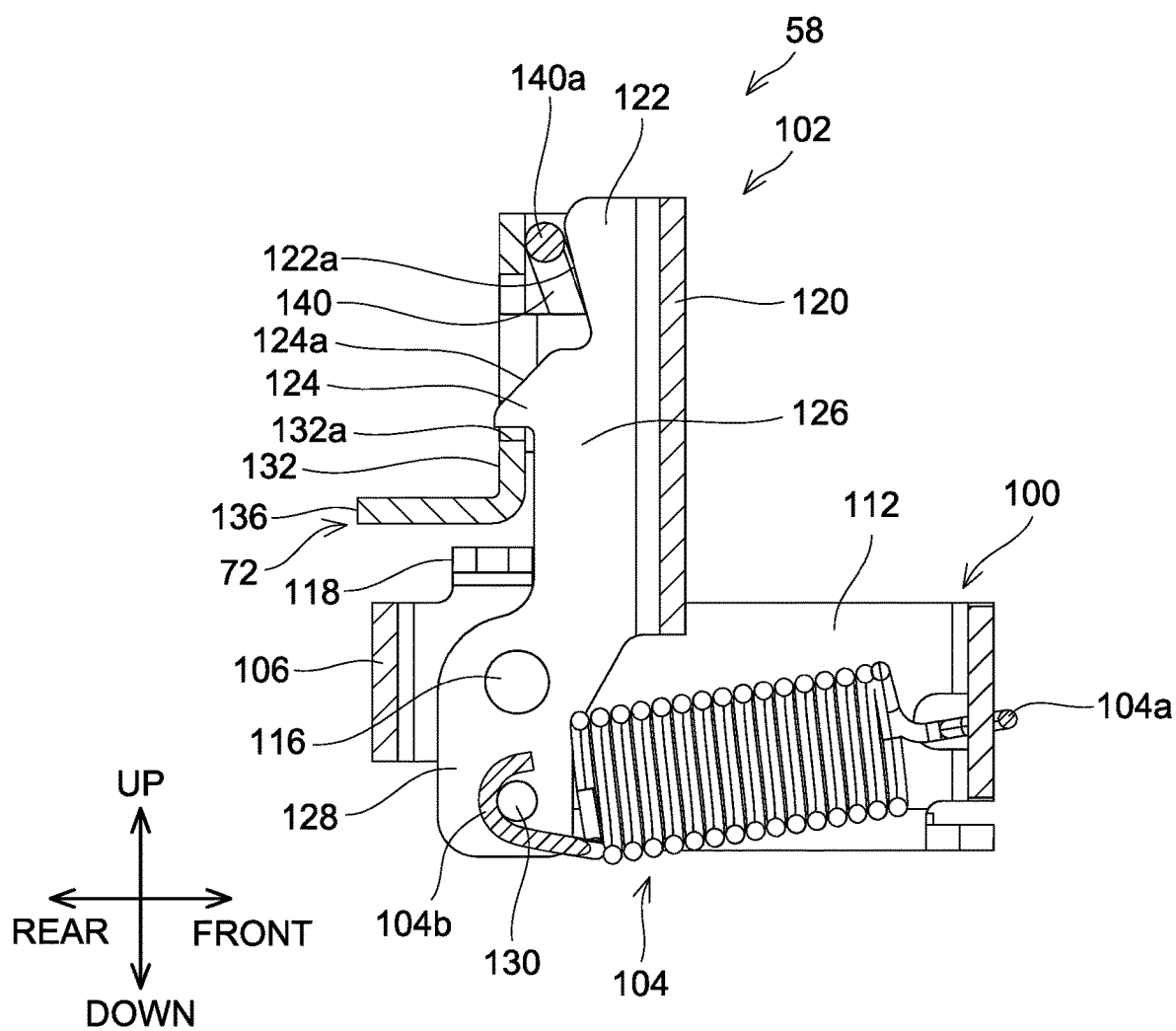
FIG. 8I is a cross-sectional view (9) showing how the lock mechanism 58, the lock receiving member 72, and the retainer member 74 according to the embodiment moves.

Then, when a lower end of the opening 132a of the base 132 of the lock receiving member 72 is moved to below the lower end of the hook 124 of the lock member 102 as shown in FIG. 8H, the hook 124 of the lock member 102 is rotated rearward and upward by the biasing force of the spring 104. As a result, the hook 124 of the lock member 102 is inserted into the opening 132a of the base 132 of the lock receiving member 72. Further, as the guide 122 of the lock member 102 is rotated rearward and upward, the crank portion 140a of the crankshaft 140 of the retainer member 74, which is in contact with the upper portion of the guide 122 of the lock member 102, is rotated rearward and upward (in the direction of arrow D23 in FIG. 8H). This is because the biasing force of the spring 104 is larger than a force that retains the crank portion 140a at an intermediate position (e.g. a position in FIG. 8H) when the crank portion 140a is at the intermediate position. Thus, the position of the crank portion 140a shown in FIG. 8H is also the "non-retaining position". As shown in FIG. 8I, the lock member 102 and the crank portion 140a are brought to the locking position and the non-retaining position, respectively. As described, the lock member 102 and the crank portion 140a can be returned to the locking position and the non-retaining position, respectively, by the user simply lowering the container frame 38.

As shown in FIGS. 1 to 8I, the cart 2 according to one embodiment comprises: the rotating frame 34; the container frame 38 configured to be rotated relative to the rotating frame 34; the lock member 102 disposed on the rotating frame 34 and configured to move between the locking position (see FIG. 8A) at which the lock member 102 restricts rotation of the container frame 38 relative to the rotating frame 34 and the unlocked position (see FIG. 8B) at which the lock member 102 allows the rotation of the container frame 38 relative to the rotating frame 34; the lock receiving member 72 disposed on the container frame 38 and configured to engage with the lock member 102 at the locking position, and the retainer member 74 disposed on the container frame 38 and configured to move between the retaining position (see FIG. 8B) at which the retainer member 74 restricts a movement of the lock member 102 from the unlocked position to the locking position and a non-retaining position (see FIG. 8A) at which the retainer member 74 allows the movement of the lock member 102 from the unlocked position to the locking position. As shown in FIGS. 8A and 8B, the lock member 102 is moved from the locking position to the unlocked position and maintained at the unlocked position by a movement of the retainer member from the non-retaining position to the retaining position. In this configuration, the lock member 102 is maintained at the unlocked position (see FIG. 8B) when the retainer member 74 is at the retaining position (see FIG. 8B). That is, even though the user does not retain the lock member 102, the rotating frame 34 and the container frame 38 are maintained unlocked. This enables the user to easily rotate the container frame 38 relative to the rotating frame 34. Thus, the convenience for the user of the cart 2 can be improved.

As shown in FIGS. 6A, 6B, and 8A to 8I, the cart 2 according to one embodiment comprises the spring 104 configured to bias the lock member 102 to the locking position from the unlocked position and bias the retainer member 74 to the retaining position from the non-retaining position. This configuration can surely maintain the lock member 102 at the unlocked position while the retainer member is at the retaining position. Further, when the retainer member 74 is at the non-retaining position, the lock member 102 can return from the unlocked position to the locking position. Thus, when the retainer member 74 is moved to the non-retaining position after the user has rotated the container frame 38, the lock member 102 can automatically return from the unlocked position to the locking position.

As shown in FIG. 4, in the cart 2 according to one embodiment, the lock member 102 may be disposed on the rotating frame 34, and the lock receiving member 72 and the retainer member 74 may be disposed on the container frame 38. This configuration allows the retainer member 74 to be disposed at a higher position as compared to a configuration where the retainer member 74 is disposed on the rotating frame 34. Thus, the user can easily operate the retainer member 74.

As shown in FIG. 5, in the cart 2 according to one embodiment, the retainer member 74 comprises the operation portion 138 configured to be operable by the user. In the top view of the cart 2, the operation portion 138 is disposed on an outer side than the rotating frame 34.

This configuration enables the user to easily operate the retainer member 74.

As shown in FIG. 7, in the cart 2 according to one embodiment, the retainer member 74 may include the crankshaft 140, and the retainer member 74 may be operated via the crankshaft 140. This configuration can improve the degree of freedom for layout of the retainer member 74 in the cart 2. In addition, the configuration requires a reduced force for the user to operate the retainer member 74. Thus, the user can easily operate the retainer member 74.

(Correspondence Relationship)

The cart 2 is an example of "handcart". The rotating frame 34 is an example of "support frame". The container frame 38 and the bucket 39 are an example of "container". The spring 104 is an example of "biasing member".

While specific examples of the present disclosure have been described above in detail, these examples are merely illustrative and place no limitation on the scope of the patent claims. The technology described in the patent claims also encompasses various changes and modifications to the specific examples described above.

(First Variant) The chassis frame 14 may be an example of "support frame". In this variant, the handcart does not include the fixed frame 30 and the rotating frame 34. In this variant, the cart 2 may not include the actuator.

(Second Variant) The lock member 102 may be disposed on the container frame 38, and the retainer member 74 may be disposed on the rotating frame 34. In this variant, the lock receiving member 72 is disposed on the rotating frame 34.

(Third Variant) The operation portion 138 may be disposed on an inner side than the rotating frame 34. Generally speaking, the operation portion 138 may be disposed at any position as long as the user can operate it.

(Fourth Variant) The "cart" may be a three-wheeled cart, a crawler cart, or the like.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A handcart comprising:
   a support frame;
   a container configured to be rotated relative to the support frame;
   a lock member disposed on one of the support frame and the container, the lock member configured to move between a locking position at which the lock member restricts rotation of the container relative to the support frame and an unlocked position at which the lock member allows the rotation of the container relative to the support frame; and
   a retainer member disposed on the other of the support frame and the container, the retainer member configured to move between a retaining position at which the retainer member restricts a movement of the lock member from the unlocked position to the locking position and a non-retaining position at which the retainer member allows the movement of the lock member from the unlocked position to the locking position,
   wherein the lock member is configured to move from the locking position to the unlocked position and be maintained at the unlocked position by a movement of the retainer member from the non-retaining position to the retaining position.

2. The handcart according to claim 1, further comprising:
   a biasing member configured to bias the lock member, wherein under a state where the lock member is at the unlocked position, the biasing member is configured to, via the lock member, bias the retainer member from the non-retaining position to the retaining position.

3. The handcart according to claim 1, wherein
the lock member is disposed on the support frame, and
the retainer member is disposed on the container.

4. The handcart according to claim 1, wherein
the retainer member comprises an operation portion configured to be operable by a user, and
in a top view of the handcart, the operation portion is disposed outward of the support frame.

5. The handcart according to claim 1, wherein the retainer member is a crank member.

* * * * *